(12) United States Patent
Youngblood et al.

(10) Patent No.: US 7,386,015 B1
(45) Date of Patent: Jun. 10, 2008

(54) DIGITALLY CONFIGURABLE MULTIPLEXER/DE-MULTIPLEXER

(75) Inventors: Douglas L. Youngblood, Palm Bay, FL (US); Christopher Ludeman, Palm Bay, FL (US)

(73) Assignee: Intersil Americas Inc., Milpitas, CA (US)

( * ) Notice: Subject to any disclaimer, the term of this patent is extended or adjusted under 35 U.S.C. 154(b) by 841 days.

(21) Appl. No.: 10/823,362

(22) Filed: Apr. 13, 2004

(51) Int. Cl.
*H04J 3/04* (2006.01)
*H04J 3/02* (2006.01)

(52) U.S. Cl. ..................... 370/535; 370/540
(58) Field of Classification Search ......... 370/533–540
See application file for complete search history.

(56) References Cited

U.S. PATENT DOCUMENTS

| | | | | |
|---|---|---|---|---|
| 3,813,497 A | * | 5/1974 | Wachs et al. ............. | 340/2.28 |
| 4,597,487 A | * | 7/1986 | Crosby et al. ............. | 194/209 |
| 4,878,215 A | * | 10/1989 | Rogers ..................... | 370/366 |
| 5,212,808 A | * | 5/1993 | Su et al. ................... | 455/502 |

* cited by examiner

*Primary Examiner*—Chirag G. Shah
*Assistant Examiner*—Ramtin Kangarloo
(74) *Attorney, Agent, or Firm*—Gary R Stanford

(57) ABSTRACT

A digitally configurable multiplexer/de-multiplexer including several multiplexers, a switch matrix, and configuration logic. Each multiplexer receives multiple address signals, selects from among multiple first data signals and couples a selected first data signal to a corresponding one of several multiplexed signals. The switch matrix has a first interface coupled to the multiplexed signals and a second interface coupled to multiple second data signals. The configuration logic receives selection signals and controls the switch matrix to couple selected ones of the multiplexed signals to the second interface.

19 Claims, 3 Drawing Sheets

DIGITALLY CONFIGURABLE MULTIPLEXER/DE-MULTIPLEXER

BACKGROUND OF THE INVENTION

1. Field of the Invention

The present invention relates to data acquisition systems, and more particularly to a digitally configurable multiplexer/de-multiplexer for routing a number of analog signals to or from selected analog front ends of a digitization block of a data acquisition system.

2. Description of the Related Art

Analog multiplexers/de-multiplexers (MUX/DEMUX) are typically configured as D:1 devices (e.g., 2:1, 4:1, 8:1 or 16:1) with "N" address inputs for selecting from among "D" analog data signals in which $D=2^N$. An analog MUX/DEMUX is typically bidirectional and may be operated as a MUX to select from among multiple inputs to an output or as a DEMUX to route an analog signal to redirect to a selected one of multiple outputs as known to those skilled in the art. The term "multiplexer" or "MUX" as used herein is intended to connote bidirectional operation in which the MUX may be used for MUX or DEMUX operations. Each configuration has traditionally been implemented on a separate integrated circuit (IC) or chip. If an analog signal needed to be dynamically re-routed to another path, additional multiplexers or switches were required and were placed in series with the signal path. Such additional devices added cost and complexity to the overall data acquisition system. In many cases, different configurations are required in the same system, which forced the designer to implement and purchase different ICs that suited each of the configurations. For example, some systems required the same signal to be routed to any number of different analog front ends that performed various functions (e.g., filtering, amplifying, etc.) depending upon the characteristics of the signal.

Conventional analog multiplexers are relatively inflexible and consume a significant amount of printed circuit board (PCB) area of the data acquisition system.

SUMMARY OF THE INVENTION

A digitally configurable multiplexer/de-multiplexer according to an embodiment of the present invention includes several multiplexers, a switch matrix, and configuration logic. Each multiplexer receives multiple address signals, selects from among multiple first data signals and couples a selected first data signal to a corresponding one of several multiplexed signals. The switch matrix has a first interface coupled to the multiplexed signals and a second interface coupled to a plurality of second data signals. The configuration logic receives multiple selection signals and is coupled to control the switch matrix to couple selected ones of the multiplexed signals to the second interface.

In one configuration, the digitally programmable multiplexer/de-multiplexer includes M multiplexers, each receiving N address signals and coupling a selected one of $2^N$ first data signals to a corresponding one of M multiplexed signals. In this case, N, M, $Y=LOG_2 M$ and N are positive integers, and the configuration logic controls the switch matrix to configure the multiplexers as a number $M/(2^{Y-X})$ of $(M/2^X)(2^N):1$ multiplexer(s) in which X is a selected integer between 0 and Y. In a specific configuration for M=4 and N=3, the digitally programmable multiplexer includes four 8:1 multiplexers, each receiving three address signals and selecting from among eight first data signals and coupling a selected first data signal to a corresponding one of four multiplexed signals. The configuration logic configures the multiplexers as four 8:1 multiplexers, two 16:1 multiplexers, or one 32:1 multiplexer.

The switch matrix may include an array of single-pole, single-throw (SPST) switches. In one embodiment using such SPST switches, the configuration logic includes a first decoder receiving at least one configuration signal, a second decoder receiving at least one address signal, and digital logic coupled to the first and second decoders to control the array of SPST switches.

Alternatively, the configuration logic includes at least one register to individually program the SPST switches. The switching matrix may alternatively be a cross-point matrix switch, where the configuration logic is configured using decoders and digital logic or registers or any other programmable method.

An integrated circuit (IC) according to an embodiment of the present invention includes first, second and third interfaces, multiplexers, a switch matrix, and configuration logic. The first interface includes first analog signal lines, the second interface includes selected analog signal lines, and the third interface includes select signal lines. Each multiplexer has multiple data signal lines coupled to the first interface, multiple address inputs coupled to the third interface, and a corresponding one of multiple multiplexed signal lines. The switch matrix has a multiplexed interface coupled to the multiplexed signal lines and a data interface coupled to the second interface. The configuration logic has an input coupled to the third interface and an output coupled to control the switch matrix to couple selected multiplexed signal lines to the second interface.

A method of routing analog signals according to an embodiment of the present invention includes distributing first analog signals among several multiplexers, selecting a configuration for the multiplexers, addressing the multiplexers according to the selected configuration, and coupling selected ones of multiplexed signals from the multiplexers according to the selected configuration to second analog data signals. The method may include combining the multiplexers into groups. The method may include routing a common set of address signals to each multiplexer of a group of multiplexers. The method may include selecting an output of a multiplexer of a group of multiplexers. The method may include selecting a multiplexed signal of a multiplexer of a group of multiplexers based on at least one address signal.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
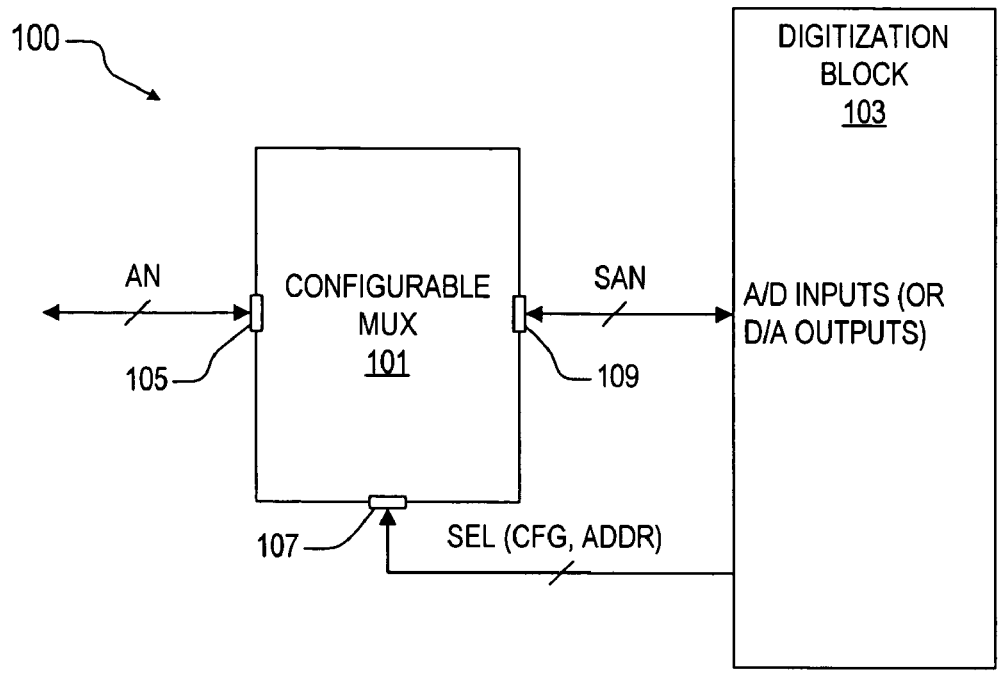
FIG. 1 is a simplified block diagram of a data acquisition system employing a digitally configurable multiplexer implemented according to an embodiment of the present invention.

FIG. 1 is a simplified block diagram of a data acquisition system 100 employing a digitally configurable multiplexer (MUX) 101 implemented according to an embodiment of the present invention. Again, the term "MUX" as used herein incorporates the concept and function of DEMUX in the opposite direction as known to those skilled in the art. The data acquisition system 100 is configured to perform various functions based on multiple analog (AN) signals. The configurable MUX 101 is used by the data acquisition system 100 to route between AN signals and a digitization block 103. For MUX operation, for example, there may be a need to route one or more of the AN signals to any number of different analog front ends via analog to digital (A/D) inputs to filter or amplify selected signals based upon the characteristics of those signals. For DEMUX operation, analog signals output from the digitization block 103 via digital to analog (D/A) outputs are routed to selected ones of the AN signals.

The configurable MUX 101 may be implemented in a discrete manner, or may be implemented as a separate configurable chip or integrated circuit (IC). In an exemplary IC embodiment, the AN signals are coupled via a first input/output (I/O) interface 105, the SEL signals are received via a second interface 107, and the SAN signals are coupled via a third I/O interface 109, where each interface includes one or more external pins on the IC. The interface 107 may include separate configuration and address inputs from the digitization block 103 depending upon the particular implementation.

In the embodiment shown, the digitization block 103 provides selection (SEL) signals to the configurable MUX 101 for selecting and routing between the AN and SAN signals, where the SEL signals include any combination of configuration (CFG) signals and/or address (ADDR) signals as further described below. In one embodiment, for example, the CFG signals are used to program the configurable MUX 101 into a selected configuration, in which the ADDR signals are then used in accordance with the selected configuration to select from among the AN signals to provide the SAN signals or to route the SAN signals to selected ones of the AN signals. Such configuration programming is dynamic in one embodiment, so that the digitization block 103 optionally re-programs the configurable MUX 101 to any one of several different configurations depending upon the configuration needed at any given time. In an alternative embodiment, the CFG signals are static or otherwise hardwired into a particular configuration needed by the digitization block 103 for a particular implementation. In yet another embodiment, the SEL signals include only ADDR signals for selecting among the AN signals, in which one or more of the ADDR signals perform switching functions as further described below.

Figure 2:
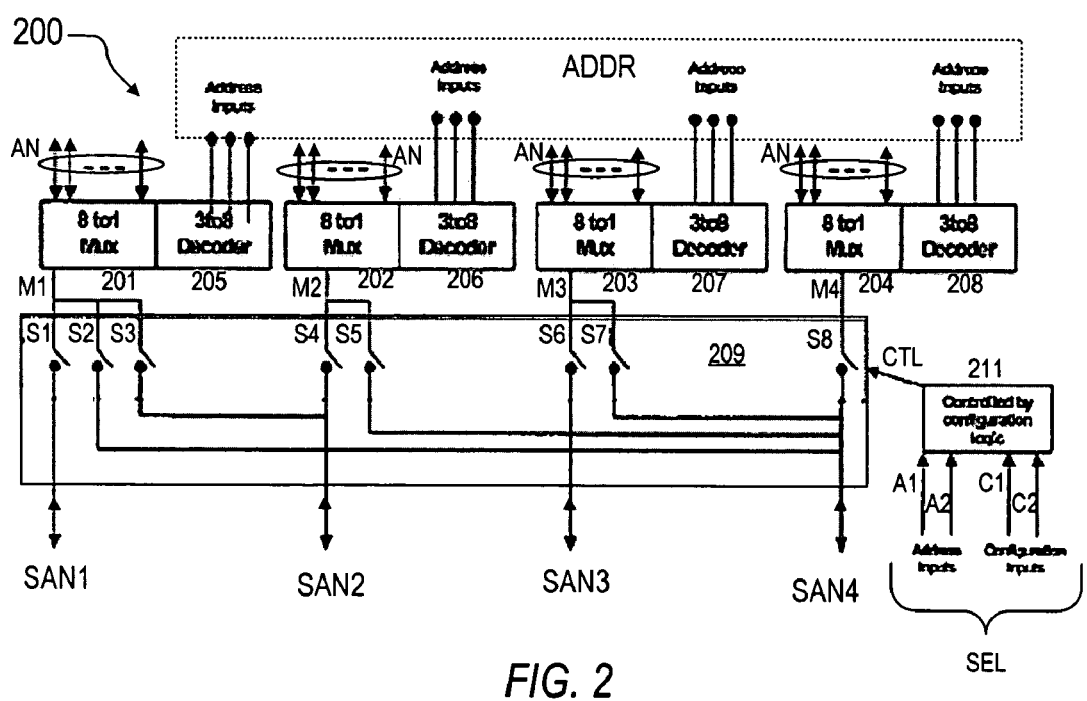
FIG. 2 is a block diagram of a configurable multiplexer according to an exemplary embodiment of the present invention which may be used as the configurable multiplexer of FIG. 1.

FIG. 2 is a block diagram of a configurable MUX 200 according to an exemplary embodiment of the present invention, which may be used as the configurable MUX 101. In this particular configuration, the AN signals include 32 signals distributed as the eight data I/O signals for each of four 8:1 MUXs 201, 202, 203 and 204, which include respective multiplexed I/O signals M1, M2, M3 and M4. The MUXs 201-204 each include or are otherwise coupled to a corresponding one of four 3:8 decoders 205, 206, 207 and 208, respectively. The decoders 205-208 each receive and decode three ADDR signals for selecting one of the eight data signals of its corresponding 8:1 MUX, as known to those skilled in the art, where the selected AN signal is asserted as the multiplexed (M) signal of the corresponding MUX or where the multiplexed signal is routed to the selected AN signal. For example, an ADDR of 000b (where "b" denotes a binary value) provided to the decoder 205 causes the MUX 201 to select its first data signal (e.g., signal 000*b*) to be coupled to the signal M1. The ADDR signals are a subset of the SEL signals from the digitization block 103.

The M1-M4 I/O signals are coupled to a first interface of a switch matrix 209, which includes a second interface coupled to the SAN signals including individual signals SAN1, SAN2, SAN3 and SAN4 as shown. The switch matrix 209 includes eight single-pole, single-throw (SPST) switches S1, S2, S3, S4, S5, S6, S7 and S8, which are controlled by control (CTL) signals asserted by configuration logic 211. Each SPST switch is normally opened and closes upon receiving a corresponding control signal from the configuration logic 211. The switches S1-S3 each have one pole coupled to the M1 signal; the switches S4 and S5 each have one pole coupled to the M2 signal; the switches S6 and S7 each have one pole coupled to the M3 signal; and the switch S8 has one pole coupled to the M4 signal. The other pole of switch S1 is coupled to the SAN1 signal; the other pole of switches S2, S5, S7 and S8 are coupled to the SAN4 signal; the other pole of switches S3 and S4 are coupled to the SAN2 signal; and the other pole of the switch S6 is coupled to the SAN3 signal. In this manner, the SAN1 signal is selectively coupled to S1, the SAN2 signal is selectively coupled to S3 or S4, the SAN3 signal is selectively coupled to S6, and the SAN4 signal is selectively coupled to S2, S5, S7 or S8.

The SEL signals include the ADDR signals provided to the decoders 205-208 and configuration signals C1 and C2 provided to the configuration logic 211. In the embodiment shown, the C1 and C2 signals are digital binary signals that define any one of up to four different configurations of the configurable MUX 200 based on selections of the switches S1-S8 and corresponding address schemes. In general, a configuration of the MUXs 201-204 is selected, the AN signals are distributed among one or more of the MUXs 201-204, the MUXs are addressed according to the selected configuration, and the multiplexed signals M1-M4 are selected according to the selected configuration. The configuration of the MUXs 201-204 may include combining into one or more groups (e.g., group of one, two, four, etc.) and routing one or more sets of address signals to each group. The multiplexed signals M1-M4 are selected by selecting a multiplexed signal of a MUX of a group of MUXs, where such selection is based on the configuration or address signals or a combination of both.

In one embodiment, the C1 and C2 signals (C2:C1) are asserted to 00b to configure the MUX 200 as four 8:1 MUXs; C2:C1=01b to configure the MUX 200 as two (or dual)16:1 MUXs; C2:C1=10b to configure the MUX 200 as one 32:1 MUX; and C2:C1=11b is not used. For the 8:1 mode, each of the 8:1 MUXs receives 3 different address bits for a total of 12 different address bits. For the 16:1 mode, the individual 8:1 MUXs 201 and 202 are combined into one 16:1 MUX and the 8:1 MUXs 203 and 204 are combined into another 16:1 MUX. In the 16:1 case, the three address bits for each combined pair of 8:1 MUXs are the same, such that a common set of address bits are routed to each MUX of a group of MUXs. Another address bit (e.g., a more significant address bit) is used by the configuration logic 211 to select between the pair of 8:1 MUXs to completely resolve the selected multiplexed M signal among the 16 data signals for each 16:1 MUX (e.g. a total of 8 address bits: 3 to each combined pair of 8:1 MUXs for each 16:1 MUX and two more address bits including one bit for each 16:1 MUX for a total of 8 address bits). For the 32:1 mode, all four of the MUXs 201-204 are combined as a single 32-bit wide MUX in which the same three ADDR signals are provided to each of the decoders 205-208, and where two additional address signals are used to select between the four 8:1 MUXs for a total of 5 address bits. As shown, the additional address signals A1 and A2 are provided to the configuration logic 211 for the 16:1 or 32:1 modes, if applicable.

Figure 3:
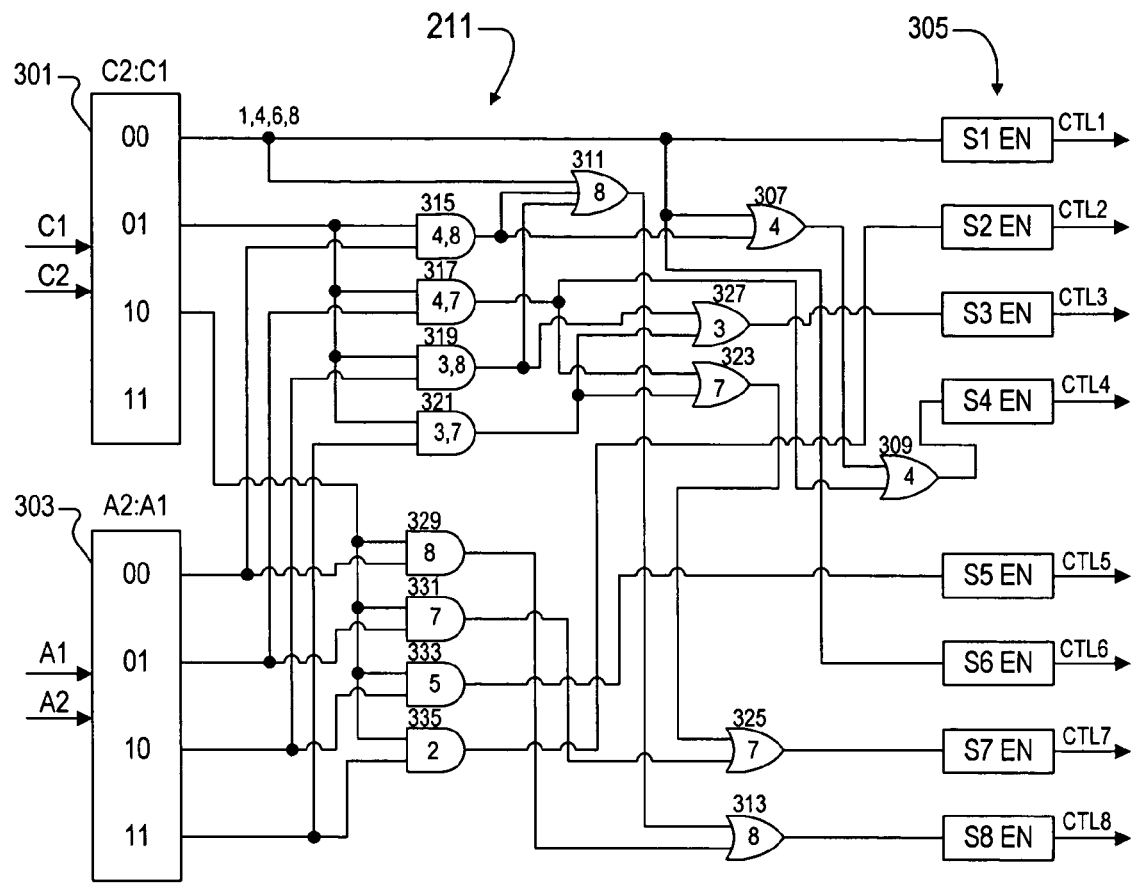
FIG. 3 is a more detailed schematic diagram of an exemplary embodiment of the configuration logic of FIG. 2.

FIG. 3 is a more detailed schematic diagram of an exemplary embodiment of the configuration logic 211. A first 2:4 decoder 301 receives the configuration signals C2:C1 and a second 2:4 decoder 303 receives the address signals A2:A1. Eight different switch enable blocks 305 are provided for asserting eight different control signals CTL1, CTL2, ..., CTL8, which control the eight switches S1-S8, respectively. The switch enable blocks 305 are individually labeled for the switch they control/enable, i.e., enable block S1 EN for asserting the CTL1 signal for controlling the switch S1, enable block S2 EN for asserting the CRL2 signal for controlling the switch S2, and so on. Each enable block 305 is configured in any suitable manner, such as a buffer or an inverter/buffer or the like as known to those skilled in the art.

The 00b output of the decoder 301 is coupled to the enable blocks S1 EN and S6 EN, to one input of a two-input OR gate 307 and to one input of a three-input OR gate 311. Each logic gate is labeled with a number indicating that its output is applied to the corresponding enable block, control signal and corresponding switch. For example, OR gate 307 is labeled with the number 4, indicating that when its output is asserted high, the CTL4 signal is asserted high closing the switch S4. The output of the OR gate 307 is coupled to one input of another two-input OR gate 309, having its output coupled to the enable block S4 EN. The output of the OR gate 311 is coupled to one input of another two-input OR gate 313, having its output coupled to the enable block S8 EN. In this manner, when C2:C1=00b, the 00b output of the decoder 301 is asserted high, which asserts the CTL1, CTL4, CTL6 and CTL8 signals, which closes the switches S1, S4, S6 and S8. This conforms to the 8:1 mode previously described in which the M1-M4 signals are selectively coupled to the SAN1-SAN4 signals, respectively.

The 01b output of the decoder 301 is provided to one input each of four two-input AND gates 315, 317, 319 and 321. The 00b, 01b, 10b and 11b address outputs of the decoder 303 are coupled to the other inputs of the AND gates 315, 317, 319 and 321, respectively. The output of AND gate 315 is coupled to a second input of the OR gate 311 and to the other input of the OR gate 307. The output of AND gate 317 is coupled to the other input of the OR gate 309 and to one input of another two-input OR gate 323. The output of the OR gate 323 is coupled to one input of another two-input OR gate 325, having its output coupled to the enable block S7 EN. The output of AND gate 319 is coupled to the third input of the OR gate 311 and to one input of another two-input OR gate 327, having its output coupled to the enable block S3 EN. The output of AND gate 321 is coupled to the other input of the OR gate 327 and to the other input of the OR gate 323. In this manner, the 01b output of the decoder 301 configures the configurable MUX 200 as a dual 16:1 MUX in which the A2 address signal determines which of the M1 and M2 signals are coupled to the SAN2 signal and the A1 address signal determines which of the M3 and M4 signals are coupled to the SAN4 signal. Thus, for C2:C1:A2:A1=0100, switches S4 and S8 are closed selecting signals M2 and M4, for C2:C1:A2:A1=0101, switches S4 and S7 are closed selecting signals M2 and M3, for C2:C1:A2:A1=0110, switches S3 and S8 are closed selecting signals M1 and M4, and for C2:C1:A2:A1=0111, switches S3 and S7 are closed selecting signals M1 and M3.

The 10b output of the decoder 301 is provided to one input each of four two-input AND gates 329, 331, 333 and 335. The 00b, 01b, 10b and 11b address outputs of the decoder 303 are coupled to the other inputs of the AND gates 329, 331, 333 and 335, respectively. The output of AND gate 329 is coupled to the other input of the OR gate 313 for asserting the CTL8 signal. The output of AND gate 331 is coupled to the other input of the OR gate 325 for asserting the CLT7 signal. The output of the AND gate 333 is coupled to the enable block S5 EN for asserting the CTL5 signal. The output of AND gate 335 is coupled to the enable block S2 EN for asserting the CTL2 signal. In this manner, the 10b output of the decoder 301 configures the configurable MUX 200 as a 32:1 MUX in which the A2:A1 address signals determine which of the M1-M4 signals are coupled to the SAN4 signal. Thus, for C2:C1:A2:A1=1000, switch S8 is closed selecting signal M4, for C2:C1:A2:A1=1001, switch S7 is closed selecting signal M3, for C2:C1:A2:A1=1010, switch S5 is closed selecting signal M2, and for C2:C1:A2:A1=1011, switch S2 is closed selecting signal M1. The 11b output of the decoder 301 is not used in the embodiment illustrated.

Although the configurable MUX 200 is illustrated using four 8:1 MUXs, it is understood that different numbers of MUXs of other sizes may instead be used. For example, to handle 32 data signals, eight 4:1 MUXs or two 16:1 MUXs may be used instead. Four 16:1 MUXs, eight 8:1 MUXs or 16 4:1 MUXs could be used for 64 data signals. In the general case, a number M of $2^N$:1 MUXs are contemplated, where M and N are positive integers. Each MUX receives N address inputs and $2^N$ data signals (for a total of $M(2^N)$ data signals) and couples a corresponding one of M multiplexed signals. The generalized configuration logic configures the number M of $2^N$: 1 MUXs as a number $M/(2^{Y-X})$ of $(M/2^X)(2^N)$:1 MUX(s) in which X is a selected integer between 0 and Y=$LOG_2$M. For purposes of illustration, note that for the configuration logic 211 in which M=4, Y=2 and N=3 using four 8:1 MUXs, such that if X=2, then the configuration logic 211 configures four 8:1 MUXs as previously described. Or if X=1, then the configuration logic 211 configures dual 16:1 MUXs as previously described. Or if X=0, then the configuration logic 211 configures a single 32:1 MUX as previously described.

Figure 4:
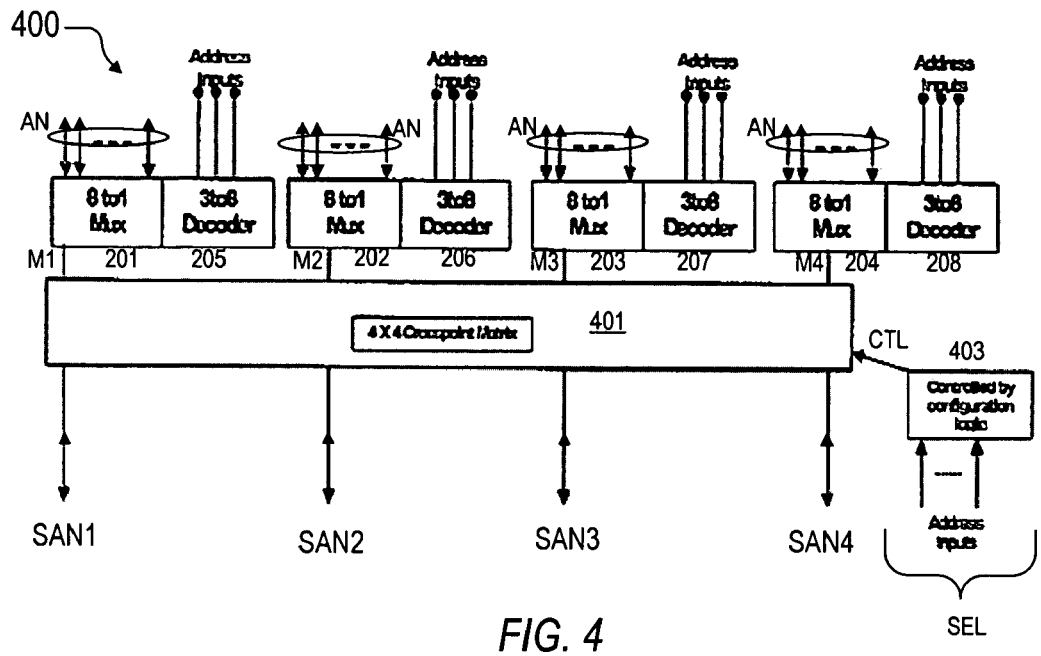
FIG. 4 is a block diagram of a configurable multiplexer according to another exemplary embodiment of the present invention which may be used as the configurable multiplexer of FIG. 1.

FIG. 4 is a block diagram of a configurable MUX 400 according to another exemplary embodiment of the present invention, which may be used as the configurable MUX 101. In this case, the 8:1 MUXs 201-204 and the decoders 205-208 are configured in substantially the same manner for selectively coupling the AN signals and the M1-M4 signals. In this case, the M1-M4 signals are coupled to respective I/O signals of a first I/O interface of a 4×4 cross-point matrix 401, which includes a second I/O interface coupled to the I/O signals SAN1-SAN4. The cross-point matrix 401 is controlled by CTL signals from configuration logic 403, which receives one or more of the SEL signals.

Figure 5:
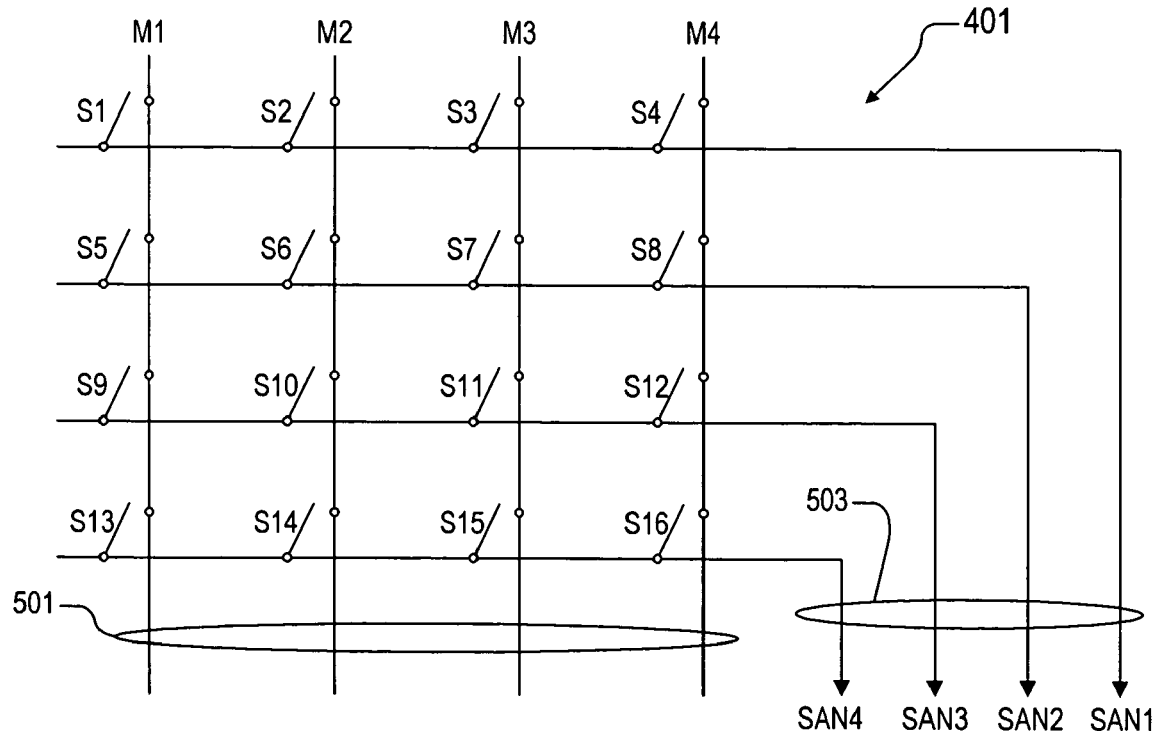
FIG. 5 is a simplified schematic diagram of the crosspoint matrix of FIG. 4 according to an exemplary embodiment of the present invention.

FIG. 5 is a simplified schematic diagram of the cross-point matrix 401 according to an exemplary embodiment of the present invention. As shown, the M1-M4 signals are distributed among four signal lines 501, individually referred to as signal lines M1-M4. A set of four signal lines 503 couple the signals SAN1-SAN4, respectively, and are referred to as the signal lines SAN1-SAN4, respectively. A set of sixteen normally-open SPST switches S1-S16 are each coupled between one signal line 501 and one signal line 503. In particular, the switches S1, S2, S3 and S4 each have one pole coupled to the SAN1 signal line, the switches S5, S6, S7 and S8 each have one pole coupled to the SAN2 signal line, the switches S9, S10, S11 and S12 each have one pole coupled to the SAN3 signal line, and the switches S13, S14, S15 and S16 each have one pole coupled to the SAN4 signal line. The other poles of the switches S1, S5, S9 and S13 are coupled to the M1 signal line, the other poles of the switches S2, S6, S10 and S14 are coupled to the M2 signal line, the other poles of the switches S3, S7, S11 and S15 are coupled to the M3 signal line, and the other poles of the switches S4, S8, S12 and S16 are coupled to the M4 signal line. The CTL signals include 16 signals CTL1-CTL16 (FIG. 6) to control the switches S1-S16, respectively, in a similar manner as previously described.

Figure 6:
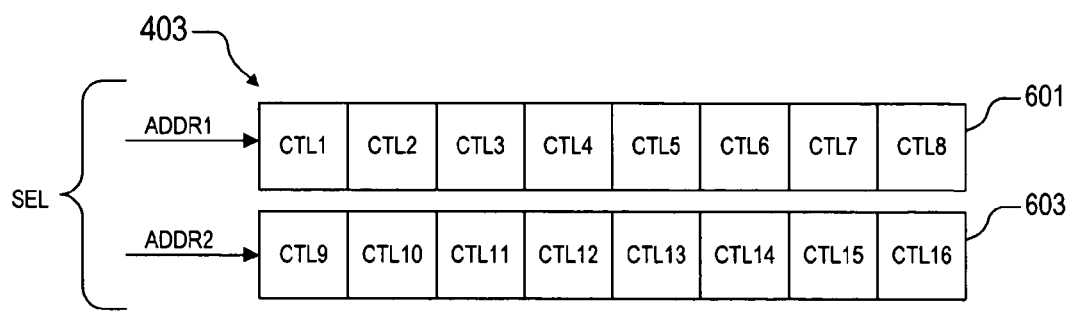
FIG. 6 is a block diagram of the configuration logic of FIG. 4 according to an exemplary embodiment of the present invention using registers.

The configuration logic 403 is implemented in any suitable fashion to configure each of the operating modes of the configurable MUX 400 according to the SEL signals. In one embodiment, a logic configuration similar to that of the configuration logic 211 is implemented to receive the SEL signals and to provide the CTL1-CTL16 signals. In a more flexible configuration, the configuration logic 403 includes one or more registers including 16 programmable bits for programming the CTL1-CTL16 signals. As shown in FIG. 6, for example, the configuration logic 403 includes a first 8-bit register 601, which stores bits CTL1-CTL8 and a second 8-bit register 603, which stores bits CTL9-CTL16. In this case, the digitization block 103 asserts a first address value ADDR1 to program the register 601 and a second address value ADDR2 via the SEL signals (or via the interface 107) to program the register 603 for programming the 4×4 cross-point matrix 401 in any desired manner. The configuration logic 211 of the configurable MUX 200 may also be implemented using register logic, such as a single 8-bit register with each bit controlling a corresponding one of the switches S1-S8 of the switch matrix 209.

In one programmed operating mode, for example, the registers 601, 603 are programmed the values 10000100b and 00100001b, respectively, to close the switches S1, S6, S11 and S16 to couple the M1 and SAN1 signal lines together, to couple the M2 and SAN2 signal lines together, to couple the M3 and SAN3 signal lines together, and to couple the M4 and SAN4 signal lines together to configure the configurable MUX 400 as four 8:1 MUXs. Similar programming enables dual 16:1 MUXs or a single 32:1 MUX. The 4×4 cross-point matrix 401 allows greater flexibility to connect any of the 32 data signals to any of the 4 SAN1-SAN4 signals. It is possible, for example, to have 4 data signals connected simultaneously to the four SAN1-SAN4 signals to create a 32:4 MUX if desired.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the appended claims.

What is claimed is:

1. A digitally configurable multiplexer/de-multiplexer, comprising:
    a plurality of multiplexers, each receiving a plurality of address signals, selecting from among a plurality of first data signals, and coupling a selected first data signal to a corresponding one of a plurality of multiplexed signals;
    a switch matrix having a first interface coupled to said plurality of multiplexed signals and a second interface coupled to a plurality of second data signals;
    configuration logic receiving a plurality of selection signals and coupled to control said switch matrix to couple selected ones of said plurality of multiplexed signals to said second interface; and
    wherein said plurality of multiplexers comprises M multiplexers, each receiving N address signals and coupling a selected one of 2N first data signals to a corresponding one of M multiplexed signals in which N, M, Y=LOG 2M and N are positive integers, and wherein said configuration logic controls said switch matrix to configure said M multiplexers as a number M/(2Y–X) of (M/2X)(2N):1 multiplexer(s) in which X is a selected integer between 0 and Y.

2. The digitally configurable multiplexer/de-multiplexer of claim 1, wherein said plurality of multiplexers comprises four 8:1 multiplexers, each receiving three address signals and selecting from among eight first data signals and coupling a selected first data signal to a corresponding one of four multiplexed signals, and wherein said configuration logic configures said plurality of multiplexers as a selected one of four 8:1 multiplexers, two 16:1 multiplexers, and one 32:1 multiplexer.

3. The digitally configurable multiplexer/de-multiplexer of claim 1, wherein said switch matrix comprises an array of single-pole, single-throw (SPST) switches.

4. The digitally configurable multiplexer/de-multiplexer of claim 3, wherein said configuration logic comprises a first decoder receiving at least one configuration signal, a second decoder receiving at least one address signal, and digital logic coupled to said first and second decoders to control said array of SPST switches.

5. The digitally configurable multiplexer/de-multiplexer of claim 3, wherein said configuration logic comprises at least one register.

6. The digitally configurable multiplexer/de-multiplexer of claim 1, wherein said configuration logic comprises at least one register.

7. The digitally configurable multiplexer/de-multiplexer of claim 1, wherein said switching matrix comprises a cross-point matrix switch.

8. The digitally configurable multiplexer/de-multiplexer of claim 7, wherein said configuration logic comprises at least one register.

9. An integrated circuit (IC), comprising:
a first interface including a plurality of first analog signal lines;
a second interface including a plurality of second analog signal lines;
a third interface including a plurality of select signal lines;
a plurality of multiplexers, each having a plurality of data signal lines coupled to said first interface, a plurality of address inputs coupled to said third interface, and a corresponding one of a plurality of multiplexed signal lines;
a switch matrix, having a multiplexed interface coupled to said multiplexed signal lines and a data interface coupled to said second interface;
configuration logic, having an input coupled to said third interface and an output coupled to control said switch matrix to couple selected multiplexed signal lines to said second interface; and
wherein said plurality of multiplexers comprises M multiplexers, each receiving N address signals and coupling a selected one of 2N first data signals to a corresponding one of M multiplexed signals in which N, M, Y=LOG 2M and N are positive integers, and wherein said configuration logic controls said switch matrix to configure said M multiplexers as a number M/(2Y−X) of (M/2X)(2N):1 multiplexer(s) in which X is a selected integer between 0 and Y.

10. The IC of claim 9, wherein said switch matrix comprises an array of single-pole, single-throw (SPST) switches.

11. The IC of claim 10, wherein said configuration logic comprises a first decoder receiving at least one configuration signal from said third interface, a second decoder receiving at least one address signal from said third interface, and digital logic coupled to said first and second decoders to control said array of SPST switches.

12. The IC of claim 9, wherein said configuration logic comprises at least one register programmable via said third interface.

13. The IC of claim 9, wherein said switching matrix comprises a cross-point matrix switch.

14. The IC of claim 13, wherein said configuration logic comprises at least one register programmable via said third interface.

15. A method of routing a plurality of analog signals, comprising:
distributing a plurality of first analog signals among a plurality of multiplexers;
selecting a configuration for the plurality of multiplexers;
addressing the plurality of multiplexers according to the selected configuration;
coupling selected ones of a plurality of multiplexed signals from the plurality of multiplexers according to the selected configuration to a plurality of second analog data signals; and
wherein said plurality of multiplexers comprises M multiplexers, each receiving N address signals and coupling a selected one of 2N first data signals to a corresponding one of M multiplexed signals in which N, M, Y=LOG 2M and N are positive integers, and wherein said configuration logic controls said switch matrix to configure said M multiplexers as a number M/(2Y−X) of (M/2X)(2N): 1 multiplexer(s) in which X is a selected integer between 0 and Y.

16. The method of claim 15, wherein said selecting a configuration comprises combining the plurality of multiplexers into groups.

17. The method of claim 16, wherein said addressing the plurality of multiplexers comprises routing a common set of address signals to each multiplexer of a group of multiplexers.

18. The method of claim 17, wherein said coupling selected ones of a plurality of multiplexed signals from the plurality of multiplexers comprises selecting a multiplexed signal of a multiplexer of a group of multiplexers.

19. The method of claim 18, wherein said selecting a multiplexed signal of a multiplexer of a group of multiplexers comprises selecting based on at least one address signal.

* * * * *